United States Patent
Nagaraj et al.

(10) Patent No.: US 9,959,195 B2
(45) Date of Patent: May 1, 2018

(54) DYNAMIC INSTRUMENTATION OF WSGI APPLICATIONS

(71) Applicant: AppDynamics LLC, San Francisco, CA (US)

(72) Inventors: Sanjay Nagaraj, Dublin, CA (US); Dan Koepke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 14/699,784

(22) Filed: Apr. 29, 2015

(65) Prior Publication Data

US 2016/0321163 A1    Nov. 3, 2016

(51) Int. Cl.
*G06F 15/16* (2006.01)
*G06F 11/36* (2006.01)
*H04L 29/06* (2006.01)
*H04L 29/08* (2006.01)

(52) U.S. Cl.
CPC .......... *G06F 11/3644* (2013.01); *H04L 67/04* (2013.01); *H04L 67/10* (2013.01); *H04L 67/22* (2013.01); *H04L 67/2804* (2013.01); *H04L 67/42* (2013.01)

(58) Field of Classification Search
USPC .......................... 709/202, 217, 219, 224, 229
See application file for complete search history.

(56) References Cited

U.S. PATENT DOCUMENTS

| | | | | |
|---|---|---|---|---|
| 5,903,732 | A * | 5/1999 | Reed ....................... | H04L 29/06 709/229 |
| 2005/0262136 | A1* | 11/2005 | Lloyd ................. | G06F 11/3447 |
| 2007/0136592 | A1* | 6/2007 | Smith ................... | H04L 63/105 713/171 |
| 2014/0136693 | A1* | 5/2014 | Greifeneder ........ | H04L 41/5067 709/224 |
| 2016/0285871 | A1* | 9/2016 | Chathoth ............ | H04L 63/0838 |

* cited by examiner

*Primary Examiner* — Liangche A Wang
(74) *Attorney, Agent, or Firm* — Parker Ibrahim & Berg LLP; James M. Behmke; Stephen D. LeBarron

(57) ABSTRACT

An agent installed on application server having a WSGI web application dynamically instruments that web application. The agent may modify the application via instrumentation such that it can be monitored without specific details of the WSGI application framework. A configuration file may be modified upon detecting a call to the application configuration file through a gateway interface that receives the call. After modifying the configuration file, the modified configuration file is executed in response to the call. Additionally, for subsequent calls to that particular web application, the WSGI gateway will call the modified WSGI configuration file for execution instead of the original WSGI file.

18 Claims, 6 Drawing Sheets

US 9,959,195 B2

DYNAMIC INSTRUMENTATION OF WSGI APPLICATIONS

BACKGROUND

The web service Gateway interface (WSGI) specification describes how a web server communicates with a web application, and how other web applications can be chained together. Programming languages such as Python use the WSGI to provide web applications.

Most monitoring applications are designed with a particular framework in mind. However, several types of frameworks may utilize the WSGI specification. Therefore, it is very difficult to know all the details of each and every WSGI framework, and it is very difficult to monitor them all with a single system. When a framework is not understood, recognized, or supported, it cannot be monitored for performance. What is needed is a an improved method for monitoring a WSGI web applications.

SUMMARY

An agent installed on application server having a WSGI web application dynamically instruments that web application. The agent may modify the application via instrumentation such that it can be monitored without specific details of the WSGI application framework. A configuration file may be modified upon detecting a call to the application configuration file through a gateway interface that receives the call. After modifying the configuration file, the modified configuration file is executed in response to the call. Additionally, for subsequent calls to that particular web application, the WSGI gateway will call the modified WSGI configuration file for execution instead of the original WSGI file.

An embodiment may include a method for monitoring an application. The method may detect a call to an application file on a server from a gateway interface that receives the call. The application file may be accessed by an agent executing on the server. The application file may be modified by the agent. The modified application file in response to the call to the application file.

An embodiment may include a system for monitoring a business transaction. The system may include a processor, a memory and one or more modules stored in memory and executable by the processor. When executed, the one or more modules may detect a call to an application file on a server from a gateway interface that receives the call, access the application file by an agent executing on the server, modify the application file by the agent, and execute the modified application file in response to the call to the application file.

DETAILED DESCRIPTION

An agent installed on application server having a WSGI web application dynamically instruments that web application. The agent may modify the application via instrumentation such that it can be monitored without specific details of the WSGI application framework. A configuration file may be modified upon detecting a call to the application configuration file through a gateway interface that receives the call. After modifying the configuration file, the modified configuration file is executed in response to the call. Additionally, for subsequent calls to that particular web application, the WSGI gateway will call the modified WSGI configuration file for execution instead of the original WSGI file.

Figure 1:
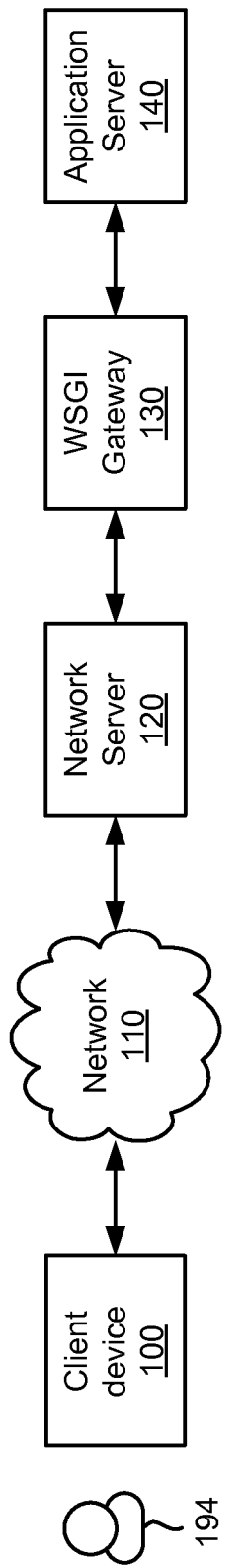
FIG. 1 illustrates a system for monitoring a WSGI application.

FIG. 1 illustrates a system for monitoring a WSGI application. The system of FIG. 1 includes client device 100, user 194, network 110, network server 120, WSGI Gateway 130, and application server 140. Client device 100 may transmit a call to network server 120 in response to a user request received by device 100 or some other event. User device 100 may include any device that may communicate over network 110, including a mobile device such as a smart phone, laptop computer, or tablet computer, or any other computing device.

Network 110 may process communications between client device 100 and network server 120. Network 110 may include a private network, public network, the Internet, and intranet, a Wi-Fi network, or some combination of these networks.

Network server 120 may receive requests over network 110, process requests, and optionally send requests to WSGI Gateway 130 along with a callback. In some embodiments, network server 120 is implemented on the same machine as WSGI Gateway 130 and application server 140. When a response is received by WSGI gateway 130, network server 120 may provide the response to client device 100 over network 110.

WSGI Gateway 130 provides environment information and callback functions to an application on application server 140. The gateway interface may communicate with application server 140. Application server 140 may process requests and return responses to WSGI gateway using a callback. Application server 140 may include an application created in a language other than Java. For example, an application on application server 140 may be based on Python language.

Figure 2:
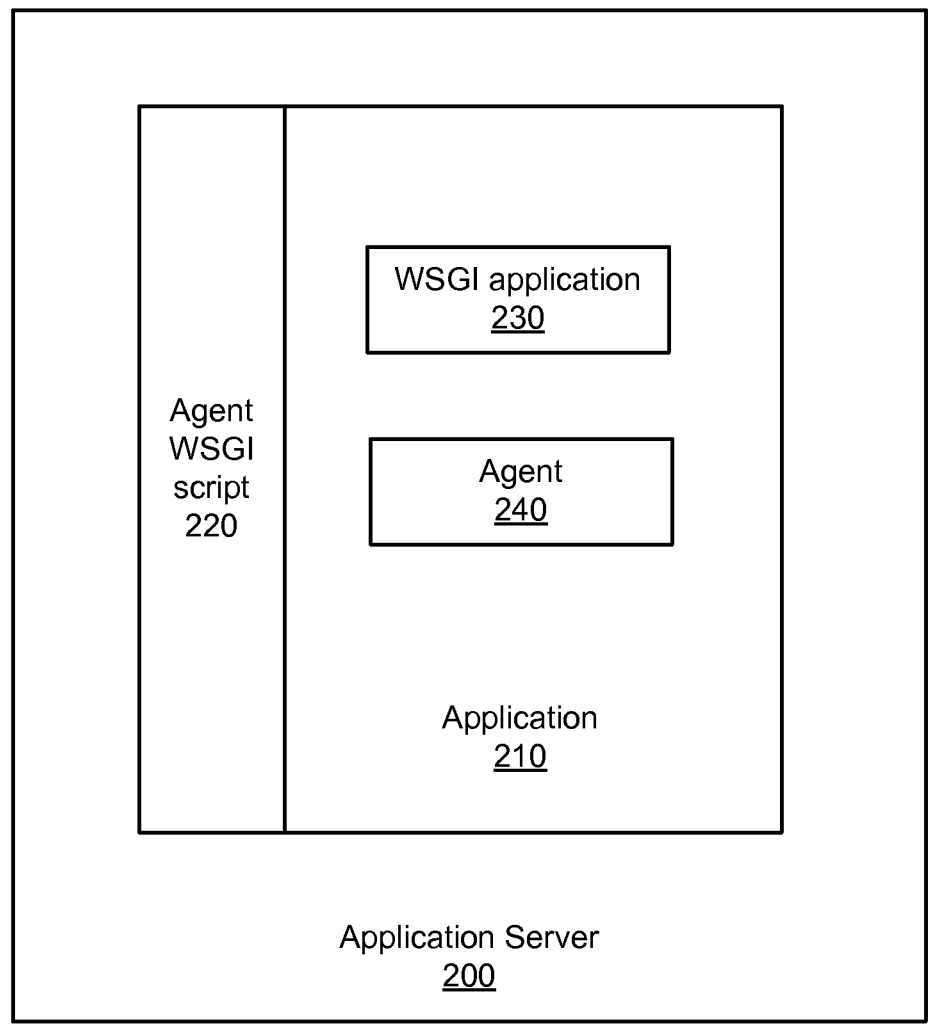
FIG. 2 illustrates a block diagram of an application server.

FIG. 2 illustrates a block diagram of an application server. Application server 200 of FIG. 2 includes application 210. The application 210 may include an agent 240 and WSGI configuration file 230. Agent 240 may modify application 210 as well as create agent WSGI script 220 for intercepting calls to the application. The WSGI application configuration file may be accessed by the WSGI Gateway to determine information about executing application 210 within the WSGI framework. Agent 240 may modify the configuration file to enable monitoring of whatever framework is implemented application 210. In some instances, application 210 may include a Python application. Agent WSGI script 220 may be installed by agent 240 and may create a new WSGI configuration file from the existing WSGI file. Subsequent calls to application 210, after the WSGI configuration call is modified, may then be directed to the new WSGI configuration file by the WSGI gateway.

Figure 3:
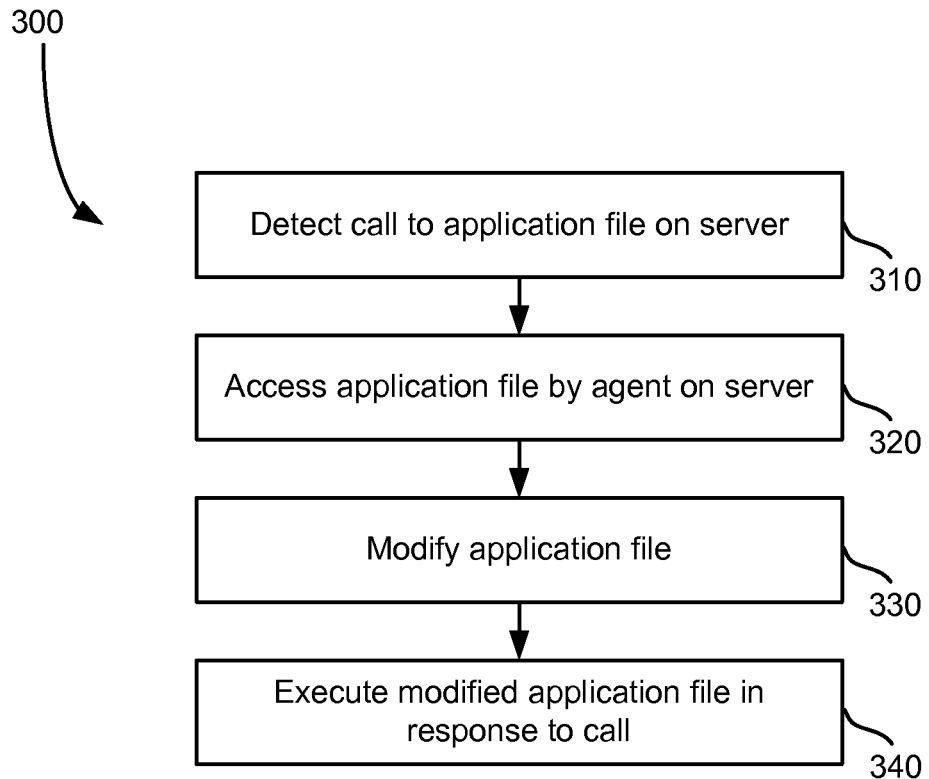
FIG. 3 illustrates a method for monitoring a WSGI application.

FIG. 3 illustrates a method for maintaining a WSGI application. First, a call to an application file on a server is detected at step 310. The application file may be a Python application or some other framework. Detecting a call is discussed in more detail below with respect to FIG. 4.

An application file is then accessed by an agent on the server at step 320. The application file may be accessed by WSGI script code provided by the agent on the application server. A WSGI configuration file is then modified at step 330. Modification of the SGI configuration file may include creating a new WSGI script call. Modification a WSGI configuration file is discussed in more detail with respect to FIG. 5. A modified application file is executed in response to the call at step 340

Figure 4:
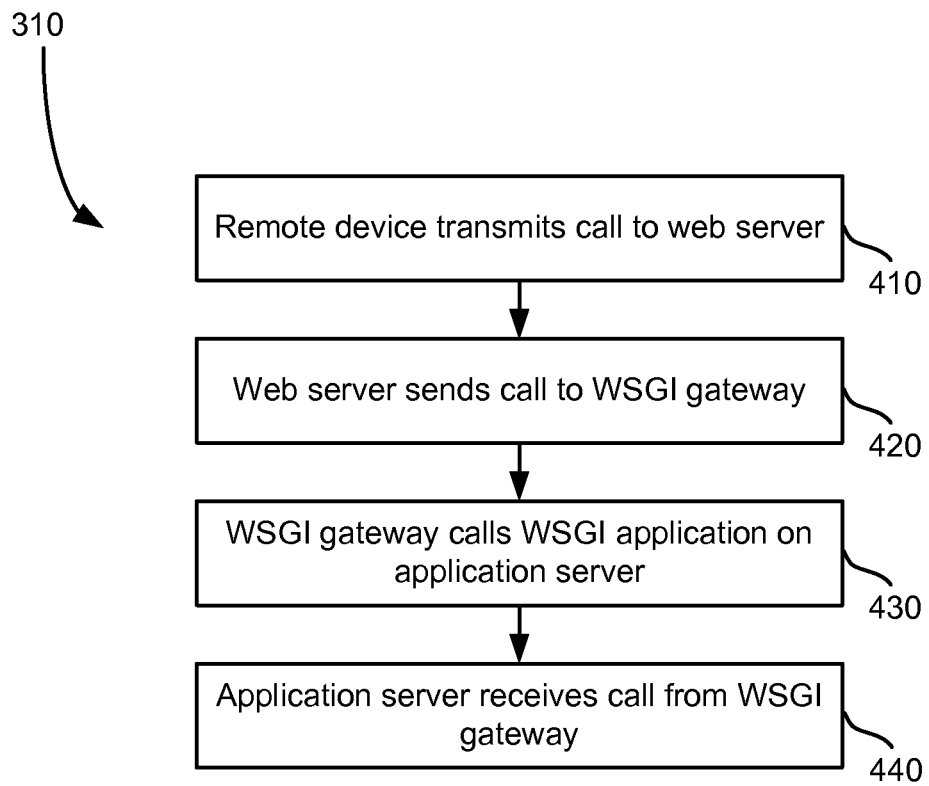
FIG. 4 illustrates a method for detecting a call to an application server.

FIG. 4 illustrates a method for detecting a call to an application server. The method of FIG. 4 provides more detail step 310 the method of FIG. 3. First, a remote device may transmit a call to a Web server at step 410. The call may be initiated by a program or user providing input to the mobile device remote device. A web server sends a call to the WSGI Gateway at step 420. The WSGI Gateway may then call the WSGI application on the application server after detecting the call at step 430. The application server then receives the call from the WSGI Gateway at step 440.

Figure 5:
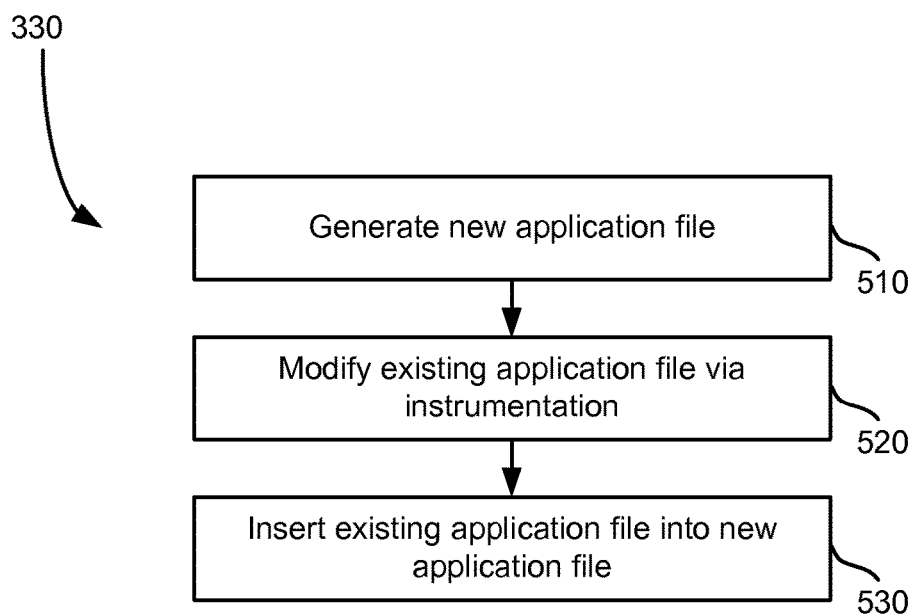
FIG. 5 illustrates a method for modifying the WSGI configuration file.

FIG. 5 illustrates a method for modifying a WSGI configuration file. The method of FIG. 5 may provide more detail for step 330 of the method of FIG. 3. First, a new application file may be generated at step 510. An existing application file may be modified via instrumentation as step 520. Instrumentation may include determining where code should be modified, including application entry points and exit points. The existing application file may then be inserted into a new application file at step 530.

Figure 6:
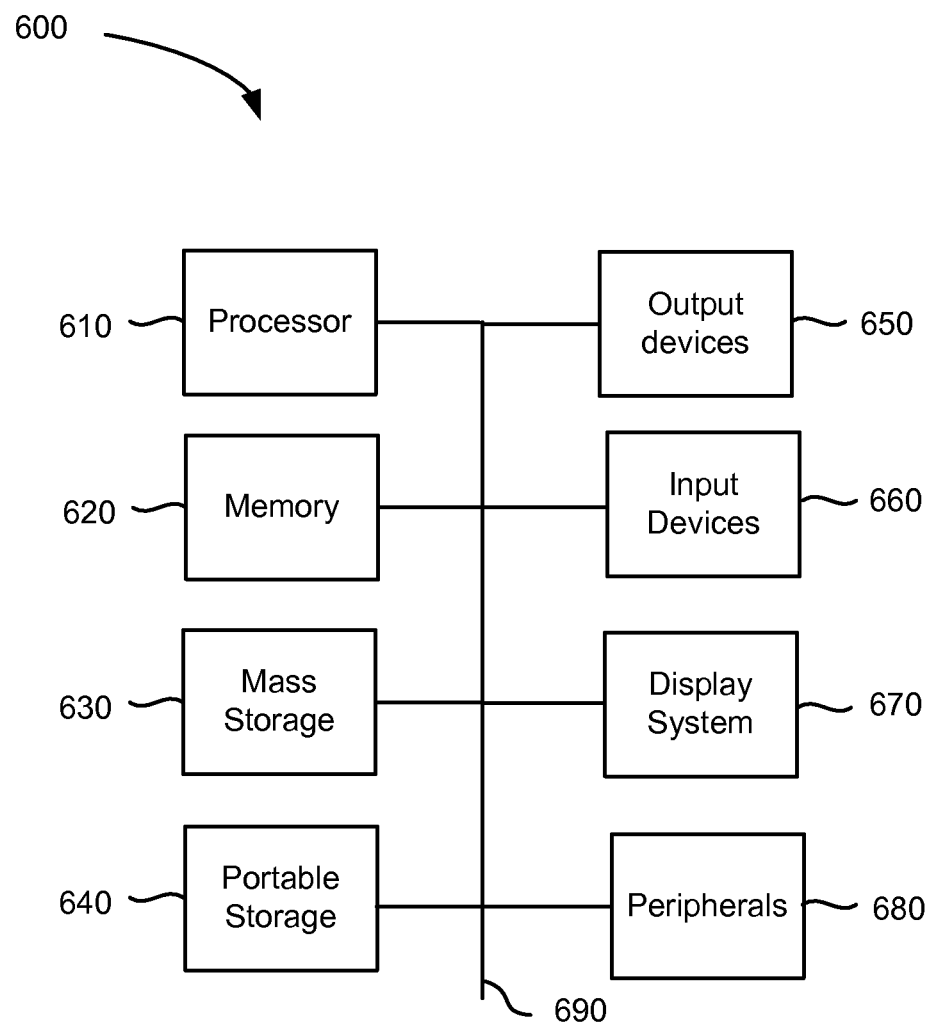
FIG. 6 illustrates a computing environment for use with the present technology.

FIG. 6 is a block diagram of a computer system for implementing the present technology. System 600 of FIG. 6 may be implemented in the contexts of the likes of client 110, network server 125, application servers 130, 140 and 150, tracer 160, data store 170, and client device 180. A system similar to that in FIG. 6 may be used to implement a mobile device able to communicate wirelessly, such as a smart phone or tablet computer, but may include additional components such as an antennas and radios, additional microphones, and other components typically found in mobile devices such as a smart phone or tablet computer.

The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring an application, comprising:
    detecting, by an agent on a server, a first call to a web service gateway interface (WSGI) application file from a gateway interface that receives the first call;
    accessing, by the agent, a configuration file associated with the WSGI application file;
    modifying, by the agent, the configuration file to include WSGI script for intercepting calls for the WSGI application file, wherein modifying the configuration file includes:
        generating a new application file, and the new application file includes an existing application file and additional code for monitoring execution of the WSGI application file;
    detecting, by the agent, a second call to the WSGI application file; and
    in response to detecting the second call, directing the second call to the modified configuration file and executing the modified configuration file.

2. The method of claim 1, wherein modifying the configuration file includes instrumenting the configuration file.

3. The method of claim 1, further comprising configuring the gateway interface to call the modified configuration file in response to detecting the second call.

4. The method of claim 1, wherein the first call originates from a remote machine and is first received by the gateway interface.

5. The method of claim 1, wherein the gateway interface is a web server gateway interface.

6. The method of claim 1, wherein the WSGI script is created by the agent.

7. A non-transitory computer readable storage medium having embodied thereon a program, the program being executable by a processor to perform a method for monitoring an application, the method comprising:

detecting a first call to a web service gateway interface (WSGI) application file from a gateway interface that receives the first call;

accessing a configuration file associated with the WSGI application file;

modifying the configuration file to include WSGI script for intercepting calls for the WSGI application file, wherein modifying the configuration file includes:
      generating a new application file, and the new application file includes an existing application file and additional code for monitoring execution of the WSGI application file;

detecting a second call to the WSGI application file; and in response to detecting the second call, directing the second call to the modified configuration file and executing the modified configuration file.

8. The non-transitory computer readable storage medium of claim 7, wherein modifying the configuration file includes instrumenting the configuration file.

9. The non-transitory computer readable storage medium of claim 7, further comprising configuring the gateway interface to call the modified configuration file in response to detecting the second call.

10. The non-transitory computer readable storage medium of claim 7, wherein the first call originates from a remote machine and is first received by the gateway interface.

11. The non-transitory computer readable storage medium of claim 7, wherein the gateway interface is a web server gateway interface.

12. The non-transitory computer readable storage medium of claim 7, wherein the WSGI script is created by the agent.

13. A system for monitoring applications, comprising:

an application server including one or more processors and memory; and one or more modules stored in memory and executable by at least one of the one or more processors to detect a first call to a web service gateway interface (WSGI) application file from a gateway interface that receives the first call; access a configuration file associated with the WSGI application file; modify the configuration file to include WSGI script for intercepting calls for the WSGI application file, wherein modifying the configuration file includes: generating a new application file, and the new application file includes an existing application file and additional code for monitoring execution of the WSGI application file; detect a second call to the WSGI application file; and in response to detecting the second call, direct the second call to the modified configuration file and execute the modified configuration file.

14. The system of claim 13, wherein modifying the configuration file includes instrumenting the configuration file.

15. The system of claim 13, the one or more modules further executable to configure the gateway interface to call the modified configuration file in response to detecting the second call.

16. The system of claim 13, wherein the first call originates from a remote machine and is first received by the gateway interface.

17. The system of claim 13, wherein the gateway interface is a web server gateway interface.

18. The system of claim 13, wherein the WSGI script is created by the agent.

* * * * *